Feb. 17, 1959  W. F. GRAHAM  2,873,982
VEHICLE DRAWBAR
Filed Jan. 15, 1957  2 Sheets-Sheet 1
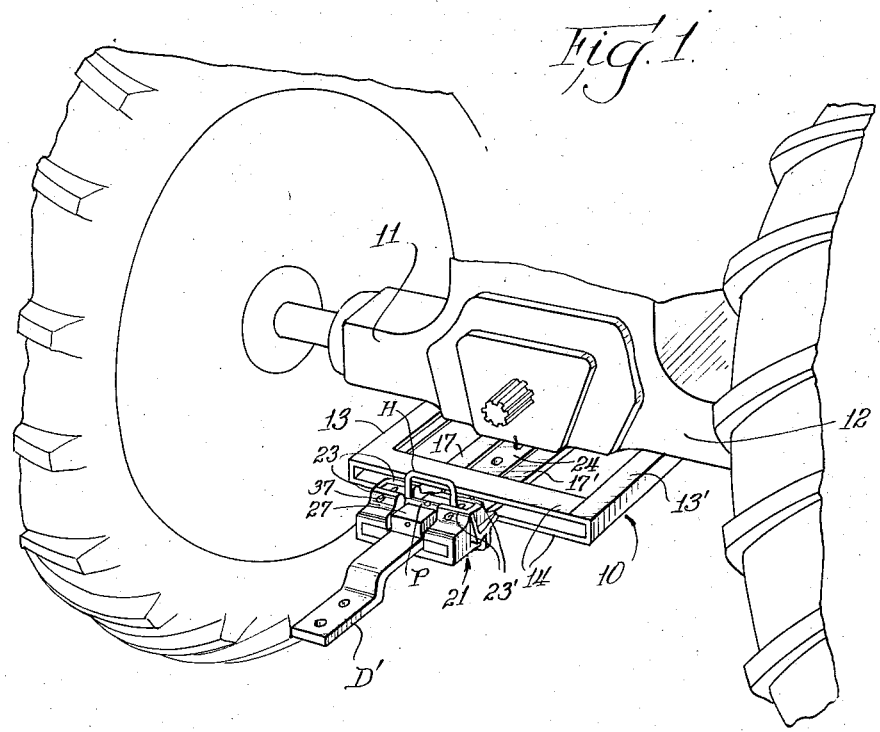
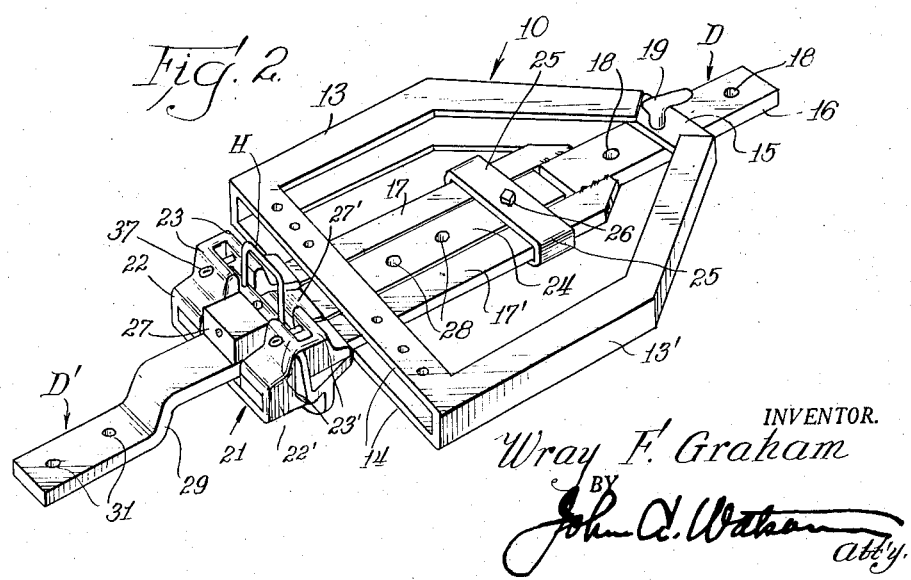
INVENTOR.
Wray F. Graham Feb. 17, 1959
W. F. GRAHAM
2,873,982
VEHICLE DRAWBAR
Filed Jan. 15, 1957
2 Sheets-Sheet 2
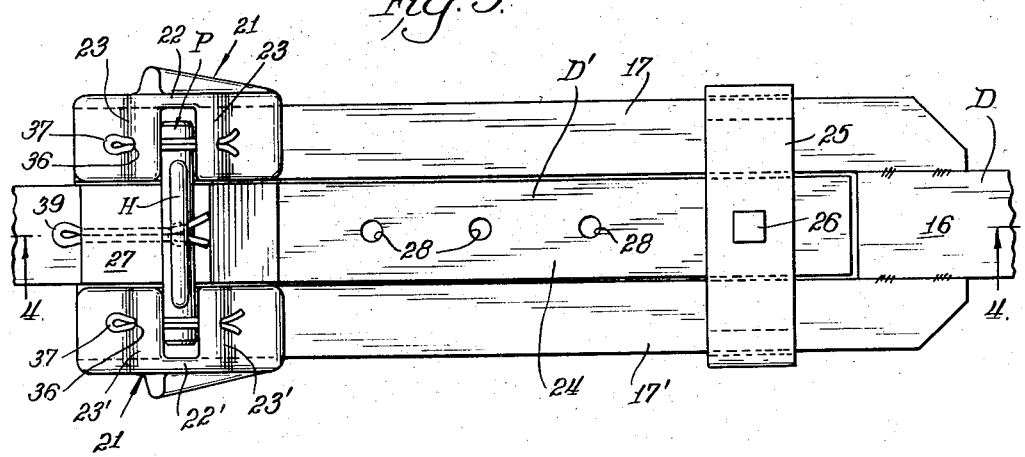
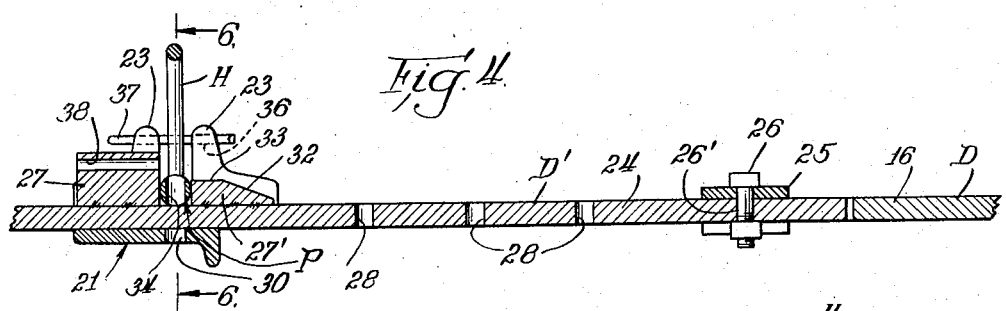
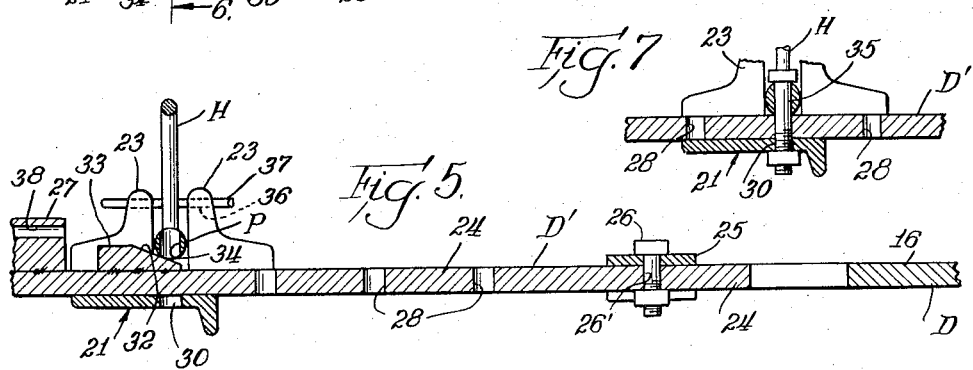
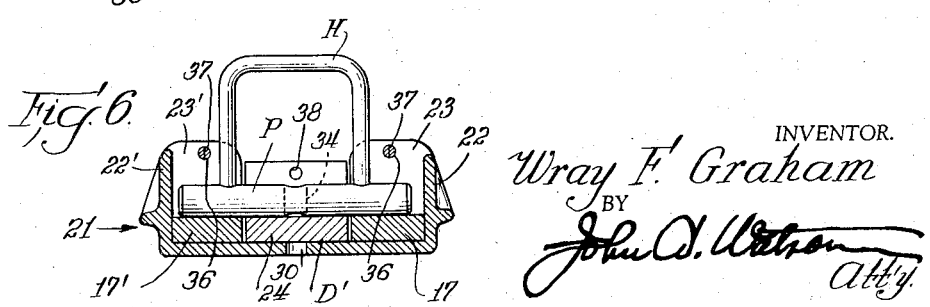
INVENTOR.
Wray F. Graham
BY
John A. Watson
Atty.

United States Patent Office 2,873,982
Patented Feb. 17, 1959

2,873,982

VEHICLE DRAWBAR

Wray F. Graham, Aurora, Ill.

Application January 15, 1957, Serial No. 634,207

5 Claims. (Cl. 280—478)

The invention hereof is concerned with draft, towbar or drawbar mechanisms adapted to be utilized in connecting one vehicle such as a tractor with some other vehicle or device such as a plow to be towed thereby.

One well recognized and common difficulty encountered in effecting the coupling of a towing mechanism such as a tractor to another vehicle or other device to be towed, is that of initially so positioning the towing vehicle drawbar or draft mechanism with respect to the tongue or coupling member of the device to be towed that the free ends of the drawbar and the tongue or coupling member of the device to be connected together are in vertical, lateral and longitudinal register or alignment. The most expert operator of a tractor for instance, finds that it is a difficult and time consuming task so to manipulate a tractor that its drawbar may be coupled with the vehicle or other machine to be towed. In many instances the operation becomes one for two persons one of whom will operate the tractor and the other of whom will direct the first and guide the draft gear into alignment for coupling. Regardless of the manpower and the skill employed the operation remains difficult and is highly dangerous. All too frequently serious accidents occur in these operations.

There have been a number of proposals for solution of the problem and while some of such proposals have met with a degree of success, none seems to have been wholly satisfactory for one reason or another. Some prior art devices intended to provide a solution are not susceptible of meeting manufacturing standards or practices, some are complicated or otherwise relatively impractical to manufacture or to use and some fail of satisfactory results for economic or other reasons.

Accordingly one of the principal objects of the invention resides in the provision of a simple and relatively inexpensive, extensible or telescoping drawbar or draft gear which will be automatically self-locking in its retracted position and yet may be manufactured, installed and used with the utmost economy of materials and labor as well as safety.

Another important object is to provide a drawbar construction of such character that it may be substituted for the ordinary or usual drawbar with which a tractor or the like may have been equipped. In this connection it may be noted that an ancillary object is to provide a construction such that the drawbar of the invention may readily be adapted to practically any tractor or other towing vehicle regardless of the source of manufacture of the latter.

Many other objects as well as the advantages and uses of the invention will appear upon reading the following description and claims and after viewing the drawings in which:

Fig. 1 is a perspective view of the rear end of a farm tractor equipped with the presently preferred form of draft gear of the invention;

Fig. 2 is a perspective view of the draft gear shown in Fig. 1 as it appears adapted to a portion of one type of supporting structure presently in commercial use;

Fig. 3 is a top plan view of a portion of the drawbar mechanism shown in Figs. 1 and 2, the supporting frame and other structure being omitted;

Fig. 4 is a view in vertical section taken along section line 4—4 in Fig. 3, the parts being represented as they appear when the extensible drawbar member is retracted;

Fig. 5 is a view corresponding to that of Fig. 4, but showing the relatively movable drawbar members in intermediate positions occupied in the course of their movement either toward extended relationship or toward retracted and interlocked relationship;

Fig. 6 is a view in transverse section taken in a vertical plane along section line 6—6 of Fig. 4; and Fig. 7 is a view in section taken in approximately the same plane as the section of Fig. 4, showing fragments of the extensible drawbar and coupling or abutment elements with a coupling or locking pin as arranged to secure the relatively movable or extensible drawbar member at a position intermediate of the extreme positions which such members may assume.

Fig. 1 shows the rear end of what may be a farm tractor, the draft gear, or, as it is more generally known, the drawbar of which is supported by and within a box frame designated 10 which, in turn, is rigidly secured to the tractor structure beneath the rear end thereof, as, for instance, to the rear axle housings 11, 12, and other parts of the chassis. The manner of securing the draft gear of the invention to the tractor partially illustrated or to another vehicle or device with which it may be employed and by which it will be supported, per se forms no part of the invention. Furthermore it is not necessary that the draft gear be utilized with any particular supporting frame, the box-frame shown being chosen merely for convenience of disclosure.

The box frame 10 consists of side members 13, 13' of channel shape, connected at their rear ends by a pair of link bars 14 which are spaced apart in parallel relationship, and connected at their forward ends by a pair (one shown) of link bars 15 also spaced apart in parallel relation. The draft gear comprises two principal members, a relatively fixed draft member and a relatively movable, extensible or telescoping draft member, generally designated D and D', respectively, in Figs. 1 and 2. The relatively fixed draft member D in this instance is composed in part of a steel bar 16 forming a stem which is disposed between the bars 15 of the frame 10 and is pivoted thereto, and a pair of steel bars 17, 17' extending rearward in parallel spaced relationship to one another from the rear end of stem 16 to which they are rigidly secured by any suitable means such as by welding.

The stem 16 may be provided with one or more drilled openings 18 in addition to that one (unseen) through which a coupling pin 19 extends so that the drawbar D may be adjusted forward or backward to any of several predetermined positions relative to the frame as may be desired. The coupling pin 19, of course extends through registering openings in the spaced link bars 15 and through one or another of the openings 18 thereby pivotally to secure the drawbar to the frame. With such construction the drawbar assembly D, D', may swing about the axis of the pivot pin 19 within such limits as may be permitted by the side members 13, 13' of the box frame 10.

At their rear ends the bars 17, 17' are secured in their parallel, spaced relationship by a yoke generally designated 21 the bottom of which extends beneath the bars and is secured thereto in rigid position either by bolting or by welding or otherwise as desired. Upwardly extending arms 22, 22' of the yoke 21 include pairs of heavy ribs 23, 23', respectively, which may be integrally formed with the yoke, as shown, or otherwise secured thereto in a vertical direction and in predetermined spaced and parallel relationship to one another. The spacing of the ribs 23 and 23' on the yoke arms 22, 22', respectively, will be such as to provide vertically extending and oppositely disposed slots running from the top surfaces of the bars 17 and 17', respectively, to the tops of the yoke arms 22, 22', respectively. The ribs 23, 23', together with the arms 22, 22' of the yoke, in effect constitute one of several cooperative coupling elements by which the relatively movable or extensible drawbar member D' is secured against longitudinal movement relative to the fixed drawbar member D.

The relatively movable or extensible drawbar member D' comprises a bar the forward length 24 of which is straight and adapted to slide backward and forward between the bars 17, 17', being supported for this purpose by a crosshead or guide 25 which, at its center, may be secured to the bar as by a bolt 26 passing through an opening 26' provided through this end of the bar. The ends of the crosshead 25 may be carried around the sides of the bars 17, 17' to positions beneath but in close proximity to the undersides of those bars thereby to prevent the crosshead and the forward end of drawbar D' from moving upward or downward out of position relative to the bars 17, 17'. It will be appreciated, therefore, that the crosshead 25 serves to retain the extensible drawbar D' against upward, downward and lateral displacement relative to the bars 17, 17' at all times. In addition the crosshead serves to limit the rearward movement of the drawbar member D' by engagement with one or the other of the spaced bars 14 of the box frame 10.

The drawbar member D' is also supported upon the upper side of the bottom of the U-shaped yoke 21 so that it may slide forward and rearward relative to the drawbar member D and the box frame. Preferably a reasonable amount of play is permitted between the various working parts for reasons readily understood. A pair of abutment or coupling members 27 and 27' are firmly secured to the top surface of drawbar member D' at predetermined spaced positions relative to one another and relative to the location of the forward end 24 of such drawbar when in its extreme forward position. The positioning or location of the members 27 and 27' will be such that when the drawbar member D' is in its extreme forward position, the slot provided by the spacing between members 27 and 27' will be in register with the slots formed by the pairs of ribs 23 and 23'. It will be understood of course that the spacing between the coupling members 27 and 27' ordinarily will be equal to the widths of the slots provided by the ribs 23 and 23'. A cylindrical coupling pin P, which may be of predetermined maximum strength to serve as a shear-pin, of a length to extend through the slot between coupling or abutment members 27, 27' and for substantial distances into the slots provided between the ribs 23, 23', and of a diameter easily to fit such slots, has a handle H by which it may be lifted out of the slots to break the coupling between the fixed and extensible drawbars D and D' to permit the latter to be moved rearward.

Toward its forward end the drawbar member D' has a series of openings 28 extending vertically therethrough at predetermined spaced intervals for a purpose later appearing. The rear end portion of the drawbar D' is offset downwardly, as indicated at 29 and may have one or more openings 31 extending vertically therethrough for the reception of a clevis pin or the like to effect coupling between the drawbar and some vehicle or implement to be drawn by the tractor. The spacing between the axis of the openings 31 and especially the spacing between those axes and the axes of the several pivot pin openings 18 in the stem 16 of drawbar D including that opening occupied by the pivot pin 19, will be determined by various factors of practical consideration including the turning radius of the tractor, the length of the tongue or hitch mechanism of the vehicle or implement to be towed, as will be understood. Also the elevation of the rear end of the drawbar D' will ordinarily be located at a fixed distance above the ground when the tractor is standing upon level ground.

It will be noted, particularly from Figs. 4 and 5, that the forward abutment member 27' has a forwardly and downwardly sloping upper face 32. The forward edge of the face 32 may terminate at the level of the top surface of the drawbar D' or it may terminate slightly there above at a distance not greater than the radius of the cylindrical pin P. At its rear end the surface 32 may terminate at a horizontal surface 33 which, preferably, will lie at a distance above the top surface of drawbar D' by an amount somewhat greater than half of the diameter of pin P, while the top of member 27 preferably will extend above the surface 33 by an amount equal to or greater than the diameter of pin P. Thus it will be apparent that the pin P at its bottom position as indicated in Fig. 4 will have its contact with bars 17, 17' along lines well below the surface 33 and also well below the top of member 27.

The pin P may have a vertically extending bore 34 substantially midway between its ends for the purpose of receiving a bolt 35 which may be passed through one or another of the openings 28 and through a registering bore 30 in yoke 21 when the drawbar D is drawn backward to some position where such opening 28 may lie beneath the bore 34 thereby temporarily to secure the extensible drawbar in one or another of its possible extended positions. The yoke 21 may also be drilled horizontally as indicated at 36 to permit the passage of cotter keys 37 arranged to pass through registering horizontal bores through the ribs 23, 23' to secure the coupling pin P as a safety measure. Likewise the abutment member 27 may have a horizontal bore 38 for the reception of a cotter key 39 which passes between the handle H and the pin P to prevent the pin P from being inadvertently lifted out of the slots when raised to clear abutment member 27'.

When it is desired to couple the tractor to another vehicle or implement having a tongue or other part to which the tractor drawbar is to be connected, the tractor may be backed up until the operator observes that the draft mechanism is in approximate alignment with and close to the tongue whereupon the operator will stop the tractor and descend to effect the coupling. The coupling pin P will be raised in the slot between the coupling elements 27, 27' by lifting the handle H. When the pin is above the level of surface 33 of element 27' the drawbar member D' may be drawn rearward to the extent desired or until its further movement is stopped by engagement of the crosshead 25. As soon as the drawbar has been moved rearward a distance sufficient to dispose the element 27' beneath pin P, the handle H may be released whereupon the pin P will ride down the sloping face 32 onto the top of drawbar D' where it will rest.

The entire drawbar assembly may be swung to one side or the other to effect any needed lateral alignment of the rear end of drawbar D' with the tongue to which it is being coupled. After the drawbar end and tongue are so related that a clevis or king pin may be passed through the selected opening 31 and a registering opening in the tongue, the tractor may be backed up toward the vehicle or implement which has been coupled to the drawbar D'. Such backward movement of the tractor will cause the drawbar to slide forward or telescope into its original position during which movement the pin P will ride along the drawbar surface, up the slope 32 and across the flat 33 after which it will drop into the slot between coupling elements 27, 27'. Since the rear element 27 is higher than the surface 33 the pin P cannot move rearward of the slot. The cotter keys 37 may then be employed to secure the pin P against upward movement in the slot. As soon as coupling pin P drops into the slot between elements 27 and 27' the two drawbar members D and D' are locked together and the coupling is complete.

Upon occasion it may be necessary to secure the extensible drawbar in an extended position to do a towing job and in that event drawbar member D' may be fully extended to the point where the yoke 25 engages the rear of the box frame 10 or it may be extended only partially to a position where a bolt or pin extended through the bore 34 in the coupling pin P will drop through one or another of the openings 28. Should it become necessary to shift both drawbar members forward or rearward relative to the box frame one of the other openings 18 may be utilized to receive the pivot pin 19. It will be apparent, of course, that the entire assembly may be easily disassembled and removed from the box frame merely by removal of the pivot pin 19 and the release of yoke 25.

While I have illustrated and described a preferred embodiment, it will be apparent that the invention is susceptible of other embodiments and of substantial modification without departing from its spirit and the scope of the appended claims.

I claim:

1. An extensible drawbar for connecting tractors and the like with an object to be drawn thereby, comprising a first draft member including a pair of spaced bars adapted to extend rearward in substantially parallel array in a generally horizontal plane from a place of attachment to a tractor, each of said bars having a first coupling element secured thereto adjacent to its rear end, each of said first coupling elements having an upwardly opening slot extending transversely of the bars and in register with the slot in the other element, a second draft member including a draft bar slidable longitudinally of and between said spaced bars and including means for interconnection with an object to be drawn, a crosshead mounted on the forward end of said second draft member and engaging said spaced bars to retain said second draft member between said spaced bars and limiting movement thereof between predetermined forward and rearward positions, a second coupling element secured to said slidable bar at a place intermediate of its ends and having an upwardly opening slot registrable with the slots in said first coupling elements when the slidable bar is in a predetermined forward position, a gravity dropping coupling pin normally extending through all of said slots when they are all in register for locking said slidable bar in said forward position and manually releasable from the slot in the coupling element on the slidable bar, said second coupling element including a wedging member forward of the slot in such element, said wedging member having an upwardly directed wedging surface that is downwardly and forwardly inclined for wedging said pin upward against the action of gravity upon movement of the slidable bar to its predetermined forward position.

2. An extensible drawbar as set forth in claim 1, wherein means is provided to limit the upward movement of the pin in the slots of the first coupling element, and the second coupling element includes an abutment member forming the rear side of the associated slot and extending upwardly to a position such that said abutment member engages said pin in any position thereof within slots of said first coupling element.

3. An extensible drawbar as set forth in claim 2, wherein the abutment member includes a substantially horizontally disposed aperture therethrough to receive a second pin extending therefrom over the coupling pin when the coupling pin is disposed in the aligned slots of both coupling elements to retain coupling pin in said slots.

4. An extensible drawbar as set forth in claim 1, wherein the draft bar has a plurality of apertures therein disposed longitudinally thereof and said coupling pin is provided with an aperture substantially perpendicular to the longitudinal axis thereof to receive a second pin therethrough and through one of the apertures in said draft bar to interconnect the draft members at positions in addition to that assumed when the slots are in alignment.

5. An extensible drawbar for connecting tractors and the like with an object to be drawn thereby, comprising a first draft member including a pair of spaced bars adapted to extend rearward in substantially parallel array in a generally horizontal plane from a place of attachment to a tractor, each of said bars having a first coupling element secured thereto adjacent to its rear end, each of said first coupling elements having an upwardly opening slot extending transversely of the bars and in register with the slot in the other element, a second draft member including a draft bar slidable longitudinally of and between said spaced bars and including means for interconnection with an object to be drawn, a crosshead mounted on the forward end of said second draft member and engaging said spaced bars to retain said second draft member between said spaced bars and limiting movement thereof between predetermined forward and rearward positions, a second coupling element secured to said slidable bar at a place intermediate of its ends and having an upwardly opening slot registrable with the slots in said first coupling elements when the slidable bar is in a predetermined forward position, a gravity dropping coupling pin normally extending through all of said slots when they are all in register for locking said slidable bar in said forward position and manually releasable from the slot in the coupling element on the slidable bar, means to limit the upward movement of said coupling pin in the slots of said first coupling element, said second coupling element including a wedging member forming the forward edge of the slot therein and an abutment member forming the rear edge of the slot therein, said wedging member having an upwardly directed wedging surface which is downwardly and forwardly inclined for wedging coupling pin upward against the action of gravity upon movement of said draft bar to its predetermined forward position, said abutment member extending upwardly to a position such that it engages said coupling pin in any position thereof within the slots in said first coupling element, said abutment member having a substantially horizontally disposed aperture therein to receive a second pin therethrough extending over said coupling pin to hold said coupling pin in the aligned slots in said coupling elements, said draft bar having apertures former therein longitudinally thereof said coupling pin having an aperture formed therein substantially perpendicular to the longitudinal axis thereof to receive a third pin therethrough to interconnect said draft members at positions other than that in which said slots are in alignment.

References Cited in the file of this patent

UNITED STATES PATENTS

| | | |
|---|---|---|
| 2,357,540 | Palmer | Sept. 5, 1944 |
| 2,412,672 | Calhoun | Dec. 17, 1946 |
| 2,717,163 | Martin | Sept. 6, 1955 |
| 2,745,680 | Achenbach | May 15, 1956 |